United States Patent [19]

Lim et al.

[11] Patent Number: 5,320,669
[45] Date of Patent: Jun. 14, 1994

[54] CEREAL GRAIN-BASED BIODEGRADABLE THERMOPLASTIC COMPOSITIONS

[75] Inventors: Seung-Taik Lim; Jay-lin Jane, both of Ames, Iowa

[73] Assignee: Iowa State University Research Foundation, Inc., Ames, Iowa

[21] Appl. No.: 992,261

[22] Filed: Dec. 14, 1992

[51] Int. Cl.$^5$ .............................................. C08L 89/00
[52] U.S. Cl. ........................................ 106/157; 106/210; 106/213; 106/130; 106/150; 127/29; 127/32; 127/34; 127/65; 264/211; 264/211.2; 264/328.1; 536/105; 536/106; 536/127
[58] Field of Search ............... 106/157, 150, 124, 130, 106/210, 213; 536/105, 106, 127; 264/211, 211.2, 328.1; 127/34, 29, 32, 65

[56] References Cited

U.S. PATENT DOCUMENTS

| | | | |
|---|---|---|---|
| 2,309,380 | 1/1943 | Brother et al. | 106/147 |
| 3,153,597 | 10/1964 | Weakley et al. | 106/139 |
| 3,169,073 | 2/1965 | Weakley et al. | 106/139 |
| 3,188,223 | 6/1965 | Weakley et al. | 106/139 |
| 3,336,246 | 8/1967 | Golick et al. | 524/797 |
| 3,351,489 | 11/1967 | Battista | 127/32 |
| 3,395,106 | 7/1968 | Curtis | 524/25 |
| 3,411,925 | 11/1968 | Lauterbach | 106/157 |
| 3,444,109 | 5/1969 | Golick et al. | 527/205 |
| 3,687,877 | 8/1972 | Runton | 525/54.1 |
| 3,836,433 | 9/1974 | Wirth et al. | 435/181 |
| 3,934,587 | 1/1976 | Gordon | 428/524 |
| 3,949,145 | 4/1976 | Otey et al. | 428/423 |
| 3,951,948 | 4/1976 | Bond et al. | 106/130 |
| 4,001,442 | 1/1977 | Stahlberger et al. | 426/105 |
| 4,076,846 | 2/1978 | Nakatsuka et al. | 426/62 |
| 4,127,563 | 11/1978 | Rankin et al. | 106/150 |
| 4,155,884 | 5/1979 | Hughes | 106/210 |
| 4,355,137 | 10/1982 | Winter | 525/54.1 |
| 4,465,702 | 8/1984 | Eastman et al. | 426/578 |
| 4,673,438 | 6/1987 | Wittwer et al. | 106/126 |
| 5,032,683 | 7/1991 | Dragner et al. | 536/104 |
| 5,057,157 | 10/1991 | Jane et al. | 127/70 |
| 5,095,054 | 3/1992 | Lay et al. | 524/47 |
| 5,158,615 | 10/1992 | Nagai | 106/157 |

FOREIGN PATENT DOCUMENTS

| | | |
|---|---|---|
| 0326517 | 8/1989 | European Pat. Off. . |
| 0327505 | 8/1989 | European Pat. Off. . |
| WO90/01043 | 2/1990 | PCT Int'l Appl. . |
| 2017124 | 10/1979 | United Kingdom . |
| 2214919 | 9/1989 | United Kingdom . |
| 2214920 | 9/1989 | United Kingdom . |

OTHER PUBLICATIONS

American Society for Testing Material (ASTM), *Book of ASTM Standards*, Designation: D 570–81, pp. 187–190 (1981).

American Society for Testing Material (ASTM), *Book of ASTM Standards*, Designation: D 638–86, pp. 210–226 (1986).

Whistler, Roy L. et al. (eds.), *Starch: Chemistry and Technology* (2nd ed.), Chapter X, at pp. 311–367, Academic Press, Inc., Orlando, Fla. publisher, (1984).

*Primary Examiner*—Anthony Green
*Attorney, Agent, or Firm*—Merchant, Gould, Smith, Edell, Welter & Schmidt

[57] ABSTRACT

The present invention provides a biodegradable thermoplastic composition made of a cereal grain that is treated with an organic solvent, and optionally a cross-linking agent such as an aldehyde, an acid anhydride or an epoxide, to link together the starch and protein of the cereal grain. The compositions may be used to make extruded or molded articles that are biodegradable, water-resistant, and have a high level of physical strength.

37 Claims, No Drawings

CEREAL GRAIN-BASED BIODEGRADABLE THERMOPLASTIC COMPOSITIONS

BACKGROUND OF THE INVENTION

Various formulations of thermoplastic compositions have been developed in an attempt to at least partially replace non-degradable petroleum-based products with biodegradable components which can be used for the manufacture of extruded and/or molded articles such as films, utensils, containers and other packaging articles. Several of these compositions have been formulated which use starches such as a destructurized starch. Although starch compositions are biodegradable, they also tend to readily absorb moisture from humid air or by direct contact with water. This causes the moisture content of a molded article to increase and the article to lose its dimensional stability, and tear or collapse.

In an attempt to improve the structural stability of articles made from starch-based compositions, other ingredients have been included in the formulations. For example, compositions have been developed that include destructurized starch in combination with a water-insoluble synthetic thermoplastic polymer such as polyolefin or a polyester. Additionally, starches have been combined with protein to form starch-protein biopolymers that can provide moldable, biodegradable thermoplastics.

Modified cereal flours, such as pregelatinized or acid-modified corn flours, have been combined with a cross-linking compound such as glyoxal, to form a resinous material that may be used as a molding compound. A drawback of such compositions is that the lipids, fatty acids, and other minor components of the cereal flour can undergo an undesirable thermal reaction during processing that is detrimental to the strength and water-resistance of the molded article.

Therefore, an object of the invention is to provide a thermoplastic material that is thermally stable and can provide articles that have an increased level of physical strength and water-resistance, being capable of tolerating exposure to water over an extended period of time with minimal or no disintegration. It is a further object to provide a thermoplastic material that is biodegradable.

SUMMARY OF THE INVENTION

The present invention provides a thermoplastic composition that comprises about 30 to 100 wt-% of a cereal grain that comprises starch and protein. The cereal grain is preferably degerminated, treated with an organic solvent such as methanol, ethanol and the like, to extract a substantial portion of the lipids and other organic solvent-soluble materials from the grain, and optionally treated with a cross-linking agent, as for example, an aldehyde such as glutaraldehyde and formaldehyde, an epoxide such as epichlorohydrin, an acid anhydride such as a mixture of adipic acid and acetic anhydride, and the like. An effective amount of the cross-linking agent is reacted with the cereal grain to bind together the starch and protein of the cereal grain particles so as to form a cross-linked composition. The solvent-treated, optionally cross-linked, cereal grain-based thermoplastics may be used to make extruded, molded or otherwise pressure-formed articles. To facilitate molding, it is preferred that the finished composition comprises about 5-30% by weight water.

The thermoplastic compositions of the invention are produced by combining a cereal grain, in the form of, for example, flour, meal, grits, or the like, with an effective amount of an organic solvent with or without water. Preferably, the amount of the organic solvent and the reaction period of the cereal grain with the solvent is effective to remove a major portion of the lipids and/or other thermally unstable components from the cereal grain. A cross-linking agent may be reacted with the cereal grain, for example, by adding the agent to the organic solvent used for extracting the lipids, and then mixing the solvent/cross-linking agent with the cereal grain, or by adding the agent to the cereal grain residue after the solvent extraction of the lipids from the cereal grain. The organic solvent, and any unreacted cross-linking agent, is then separated from the cereal grain, for example, by filtration or centrifugation, to provide a residue of the solvent-treated cereal grain. It is preferred that the residue is then washed with a portion of organic solvent, or aqueous solvent, to remove residual lipids and other thermally unstable materials, and excess cross-linking agent from the residue. The cereal grain residue is then dried to remove the organic solvent, and remoistened to a predetermined moisture content.

The remoistened residue may be mixed with other ingredients such as a plasticizer, a lubricating agent, an extender, and the like, in order to facilitate molding of the composition into a shaped article. The cereal grain-based thermoplastic compositions of the invention may be molded or shaped by conventional processing techniques, such as by compression molding, injection molding, blow molding, vacuum forming, thermo-forming and the like. The articles that are formed from the present compositions are translucent in appearance and have a high degree of mechanical strength, and water-resistance. Advantageously, the cereal grain-based thermoplastics of the invention are biodegradable, and are suitable for use in making articles that are disposable, and/or edible by a human or other animal after use, as for example food containers, tablewares, and the like.

Although the articles made from the composition of the invention will disintegrate over time when exposed to moisture, such as from the atmosphere and the package contents, or from submersion in water or other direct contact with water, the articles of the invention, particularly those that include a cross-linking agent, have a higher resistance to disintegration by moisture and will remain substantially intact for a more extended period of time than articles made from prior art starch-based thermoplastics. Most cereal grains comprise about 5 to 40 wt-% protein, and portions of the protein component, such as gluten and zein, are water-insoluble which may help increase the water-resistance of articles formed from the present compositions. Advantageously, both the starch and protein components are derived from a single source, i.e., the cereal grain. Thus, the thermoplastic formulations of the present invention eliminates the need to combine the starch and protein components as separate ingredients.

DETAILED DESCRIPTION OF THE INVENTION

The thermoplastic compositions of the invention comprise a cereal grain from which a substantial portion of the lipids and other thermally unstable substances have been removed by extraction with an organic solvent such as methanol, ethanol, and the like, or an aqueous solvent, or a mixture thereof. Preferably, the cereal grain is also degerminated to remove a major portion of the cereal lipids. The present thermoplastics are prepared by extracting a major portion of the lipids and other thermally unstable substances from a cereal grain with an organic solvent, removing the solvent extract, and remoistening the residue with an amount of water to facilitate molding of the composition into the desired article.

Preferably, the cereal 9rain is treated with a bi-functional cross-linking agent such as an aldehyde, an epoxide, an acid anhydride, or other suitable agent. The reaction of the cross-linking agent with the starch and protein of the cereal particles causes the formation of starch-protein linkages, starch-starch linkages, and/or protein-protein linkages.

The cereal grain-based thermoplastics of the invention may be used to make extruded, molded or otherwise pressure-formed articles of various shapes, forms and sizes. The articles formed from the solvent-treated, cereal-based thermoplastics of the invention, particularly those that are formed from solvent-treated and cross-linked cereal grain, have an increased level of water-resistance and structural stability compared to articles formed from other starch-based thermoplastics.

As used herein, unless otherwise noted, the wt-% of the components of the composition are based on the total dry weight of the composition.

Cereal Grains. The compositions of the invention include a native or natural cereal grain. The phrase "cereal grain," according to the invention, includes any starch/protein-containing cereal grain in a particulate form such as a milled flour, meal, grits, and the like, that may be processed according to the method of the invention to provide a thermoplastic composition as described herein. The cereal grain may be treated with a bleaching agent, as for example, with chlorine gas, hydrogen peroxide ($H_2O_2$) or benzoyl peroxide, or other like oxidizing agents, or nutritionally reinforced, as for example with vitamins or minerals.

Native or natural cereal grains that are useful according to the invention include, for example, corn (maize), waxy corn, rice, waxy rice, hard wheat, soft wheat, durum wheat, rye, oat, barley, sorghum, millet, triticale, amaranth, high amylose corn, and the like. The cereal grain may comprise a normal starch (about 20–40% by weight amylose), a waxy starch (about 0–8% by weight amylose), or a high-amylose starch (greater than about 50% by weight amylose). Preferably, the cereal grain is capable of being cross-linked together with a cross-linking agent that will bind with the starch and protein of the cereal grain to form starch to starch cross-links, protein to protein cross-links, and starch to protein cross-links.

A preferred composition prior to molding, comprises about 30 to 100 wt-% cereal grain, more preferably about 50 to 95 wt-%, more preferably about 60 to 90 wt-%, based on the total dry weight of the composition. It is also preferred that the cereal grain comprises about 60 to 95% starch, and about 5 to 40% water-insoluble proteins such as gluten and zein.

Organic Solvent. Cereal lipids are often concentrated in cereal germs, and degerminated cereal grains generally contain less than about 5% lipids in the endosperm. Native cereal grains contain lipids that may undergo undesirable reactions, such as oxidation, during thermal processing of a composition that includes the cereal grain. Such thermal reactions may alter the composition to the extent that the strength, durability, and/or water-resistance of an article that is formed from the composition is diminished. To avoid such undesirable changes in the composition, the cereal grain, preferably degerminated, is mixed with an organic solvent for a time effective to extract the lipids such as free fatty acids, glycolipids, phospholipids, nonpolar lipids, and the like, and other thermally unstable materials, from the cereal grain.

Organic solvents that may be used according to the invention include alcohols (absolute or aqueous) such as methanol, ethanol, isopropanol, n-propanol, butanol, and the like; alkanes such as n-pentane, n-hexane, petroleum ether, and the like; and ethers such as diethylether and the like; halides such as methylene chloride, chloroform, and the like; aromatics such as benzene, and the like; esters such as ethylacetate, and the like; and ketones such as acetone, and the like.

Preferably, the cereal grain is combined with the organic solvent in a grain:solvent parts by weight ratio of about 1:1 to 1:10, more preferably about 1:1 to 1:5, more preferably about 1:1.5 to 1:3. The solvent is allowed to react with the grain, with or without stirring and with or without heating, for a time effective to remove a substantial majority of the lipids and thermally unstable materials such as natural oxidizing agents, including free fatty acids, glycolipids, phospholipids, non-polar lipids, and the like, from the cereal grain.

The lipids are extracted from the cereal grain particles by the solvent, typically as an off-white to yellow colored oily substance. The time required for removal of the lipids from the grain will vary depending, for example, on temperature, types and amounts of residual lipids, the extraction solvent used, and mechanical stirring. The solvent extraction time is about 0.5 to 24 hours, preferably about 1 to 12 hours, more preferably about 1 to 6 hours. To accelerate the extraction of lipids from the cereal grain, the grain/solvent mixture may be agitated and/or heated, preferably to reflux, to the boiling temperature of the solvent.

Preferably, an effective amount of the lipids of the cereal grain are extracted by the solvent such that, during processing, any thermal reaction of the lipids that are present in the composition will not substantially alter the properties of the thermoplastic composition and articles that are formed from the composition, particularly the water-resistance, physical strength or other mechanical properties. The solvent containing the extracted cereal lipids is then removed by centrifugation or filtration, preferably with an aspirator. The defatted cereal residue is preferably washed with additional solvents. Preferably, the lipid content of the composition is less than about 2 wt-%, more preferably less than about 1 wt-%.

Cross-Linking Agent. The cereal grain may further be treated with a cross-linking agent, preferably a bifunctional cross-linking agent. The cross-linking agent preferably binds the protein of the cereal grain together in a protein to protein linkage, binds the starch together in a starch to starch linkage, and links the starch to the protein in a starch to protein linkage. The treatment of the cereal grain with a cross-linking agent provides a cereal grain-based thermoplastic composition that may be molded or otherwise formed into an article that has an increased level of water resistance and improved mechanical properties over articles formed from other starch, or cereal grain-based thermoplastics that are made without a cross-linking agent.

Suitable cross-linking agents according to the invention, include, but are not limited to, aldehydes such as glutaraldehyde, formaldehyde, glyoxal, acetaldehyde, acrolein, glyceraldehyde, furfuraldehyde, malonic dialdehyde, succinic dialdehyde, adipic dialdehyde, starch dialdehyde, and the like; epoxides such as epichlorohydrin, 3-chloro-1,2-epoxypropane, 3-bromo-1,3-epoxypropane, 3-chloro-1,2-epoxybutane, 3-4-dichloro-1,2-epoxybutane, 4-chloro-1,2-epoxypentane, chloroepoxyoctanes, and the like; polyepoxides such as vinyl cyclohexane dioxide, butadiene dioxide, and the like; acid anhydrides such as a mixture of adipic acid and acetic anhydride, a mixture of citric acid and acetic anhydride, a mixture of adipic acid and propionic anhydride, a mixture of citric acid and propionic anhydride, and the like; and phosphate cross-linking agents such as phosphorus oxychloride, soluble metaphosphates, and the like.

Preferably, the cereal grain is treated with a cross-linking agent in an amount effective to link together the starch and protein of the cereal grain particles to form a cross-linked, thermoplastic composition that can be molded into an article that has the desired level of structural stability and water resistance. The cross-linking agent is reacted with the solvent-treated grain for a time effective to bind together the starch and protein molecules. Preferably, the cereal grain is combined with a cross-linking agent in a weight ratio of about 90:10 to about 99.99:0.01, more preferably about 95:5 to about 99.5:0.5, more preferably about 98:2 to about 99:1. The reaction of the cross-linker with the cereal grain is carried out for about 0.5 to 24 hours, more preferably about 1 to 6 hours.

The cross-linking agent may be mixed with the organic solvent, and then combined with the cereal grain to achieve extraction of the lipids and cross-linking of the cereal grain. Alternately, the cross-linking agent, preferably diluted in an organic solvent, may be added to the cereal grain after the solvent extraction step, for example, by combining the cross-linking agent with the cereal grain/solvent admixture or with the cereal grain residue after the solvent has been removed. The mixture may be heated to accelerate the cross-linking reaction, for example, to reflux, to the boiling temperature of the solvent. Excess cross-linking agent in the treated cereal grain residue can be removed, as for example, by washing the residue with an organic solvent, water, and the like.

Other Additives

Plasticizers. It can be appreciated that the finished composition may include about 5–30 wt-% water which may provide a plasticizing effect. In addition to the residual amount of water, to facilitate processing of the cereal grain-based compositions of the invention and to increase the flexibility and toughness of the molded article, a minor but effective amount of a compatible plasticizer may also be included in the present composition. Plasticizers that may be used according to the invention, alone or in combination, include low molecular weight hydrophilic organic compounds such as di- or polyhydric alcohols and derivatives thereof, as for example, glycerol, glycerol monoacetate, diacetate or triacetate, sorbitol, sorbitan, mannitol, maltitol, ethylene glycol, diethyl glycol, propylene glycol, polyvinyl alcohol, and the like; sodium cellulose glycolate, cellulose methyl ether, and the like; sodium diethysuccinate, triethyl citrate, and the like; and polyalkylene oxides such as polyethylene glycols, polypropylene glycols, polyethylene propylene glycols, polyethylene glycol fatty acid esters, and the like. The amount of plasticizer that would be included in the composition is about 0.2 to 20 wt-%, preferably about 0.5 to 10 wt-%, based on the total weight of the solids in the composition.

Lubricants. The composition may further contain a minor but effective amount of a lubricating agent effective to provide a mold- or dye-lubricating effect when the composition is molded into the desired article, for example, by aiding in the release of the molded article from the mold. Water-insoluble lubricants may also increase the water-resistance of the products. Examples of suitable lubricants that may be used in the compositions, either alone or in combination with another lubricant, include mono- and diglycerides, and fatty acids, preferably saturated fatty acids; phospholipids such as lecithin; fatty acid esters; phosphoric acid-derivatives of the esters of polyhydroxy compounds; vegetable oil, preferably hydrogenated forms; animal lipids, preferably hydrogenated forms to prevent thermal oxidation; and petroleum silicone, waxes, and mineral oils. The amount of lubricant contained in the composition is preferably about 2 wt-% or less, more preferably about 0.1 to 1 wt-%, based on the total solids weight of the composition.

Extenders. Extenders, for example, water soluble polysaccharides such as methylcellulose, carboxymethylcellulose, hydroxymethylcellulose, and microcrystalline cellulose, natural cellulose, cellulose acetate, cellulose nitrate, and synthetic polymers such as poly(acrylic acids), poly(methacrylic acids), poly(vinyl acetates), poly(vinyl alcohol), and poly(vinyl acetate phthalate), ethylene/vinyl acetate copolymer, ethylene/vinyl alcohol copolymer, polyhydroxybutylate, and the like, natural and modified gums such as xanthan gum, guar gum, gum arabic, alginates, carrageenan, pectin, agar, konjac flour, and the like, may also be included in the composition. Preferably, an extender is included in the composition in an amount of about $\leq 50$ wt-%, more preferably about 3 to 20 wt-%, based on the total solids weight of the composition.

Preservatives. A compatible antimicrobial agent such as a fungicide or bactericide may also be included in the composition in an amount effective to prevent growth of fungi, bacteria and the like, in or on the compositions or an article formed from the compositions. The antimicrobial agent should not induce undesirable interactions or chemical reactions between the components of the composition.

Colorants: The compositions may further include a coloring agent. Coloring agents, suitable for use in the present compositions include, for example, azo dyes such as Bismarck Brown 2R and Direct Green B; natural coloring agents such as chlorophyll, xanthophyll, carotene, and indigo; and metallic oxides such as iron or titanium oxides. The coloring agent may be included in the composition at a concentration of about 0.001 to 10 wt-%, preferably about 0.5 to 3 wt-%, based on the total solids weight of the composition.

Edible Compositions. The present cereal grain-based thermoplastic composition may be comprised entirely of ingredients that may be consumed at nontoxic levels by a human or other mammal. In that case, the article formed from the composition would be biodegradable as well as edible by a mammal. An edible composition according to the present invention, would comprise, for example, a natural, unmodified cereal grain such as corn meal, durum wheat flour, and wheat flour, that has been treated with an organic solvent such as ethanol, for lipid extraction, and a cross-linking agent such as starch dialdehyde, phosphorous oxychloride, or a mixture of adipic and acetic anhydrides. An edible composition may further include an edible plasticizer such as sorbitol and glycerol, a lubricating agent such as lecithin and mono-or diglycerides, an extender such as natural or microcrystalline cellulose, and/or an antimicrobial agent such as methyl paraben. An effective amount of an edible flavoring agent such as cocoa, vanillin, fruit extracts such as strawberry and banana, and the like, may also be included to enhance the taste of an edible composition.

Preparation of Thermoplastic Compositions and Formed Articles

The compositions of the invention may be prepared by combining a cereal grain with an effective amount of an organic solvent, preferably in a grain:solvent parts by weight ratio of about 1:1 to 1:5, and for a time effective to extract a substantial proportion of the lipids from the cereal grain, preferably about 0.5 to 24 hours, more preferably about 1 to 12 hours, even more preferably about 1 to 6 hours. After a suitable extraction period, the organic solvent and extracted lipids are separated from the cereal grain, for example, by filtration, decanting or centrifugation. To speed the solvent extraction of the lipids from the cereal grain, the mixture may be heated, preferably with reflux, to the boiling temperature of the solvent.

A cross-linking agent may be reacted with the cereal grain by mixing the cross-linking agent with the organic solvent, and then combining the solvent/cross-linking agent mixture with the cereal grain. Alternately, the cross-linking agent in a portion of a liquid, such as water or an organic solvent, may be added to the cereal grain residue after the solvent extraction step. The amount of the cross-linking agent combined with the cereal grain and the time period of the reaction of the cross-linking agent with the cereal grain is related so as to be effective to provide cross-linking of the starch and protein of the cereal grain particles, and to bind the cereal grain particles together to form a cross-linked composition. Preferably, the cereal grain is combined with the cross-linking agent in a cereal grain:cross-linking agent weight ratio of about 90:10 to about 99.99:0.01, more preferably about 95:5 to about 99.5:0.5, more preferably about 98:2 to about 99:1. The reaction of the cross-linker with the cereal grain is carried out for about 0.5 to 24 hours, more preferably about 1 to 6 hours. The mixture may be heated to accelerate the cross-linking reaction, unless the starch component of the cereal grain is gelatinized.

The solvent-treated, cereal grain residue is preferably washed with an amount of an organic solvent, or water, effective to remove the residual lipids, and unreacted cross-linking agent, from the residue. The residue is then dried, as for example, in an oven, to substantially remove the residual solvent. The dried residue may be further processed, as for example, by crushing or grinding the residue into a powder, granules and the like.

A composition prior to molding may be prepared by reacting a cereal grain, preferably corn flour or wheat flour, with an effective amount of an organic solvent or aqueous solvent to extract a substantial portion of the lipids from the cereal grain, with ethanol (95%) being preferred, preferably, in a cereal grain:solvent weight ratio of about 1:1 to 1:5, more preferably about 1:1.5 to 1:3, the extraction period being about 0.5 to 24 hours at ambient temperature (i.e. about 20° to 30° C.), more preferably about 1 to 12 hours, more preferably about 1 to 6 hours, at an elevated temperature with reflux; removing the organic solvent extract; combining the residue with a minor but effective amount of a cross-linking agent diluted in an aqueous alcohol to bind the starch and protein of the cereal grain together to form a cross-linked composition, preferably in a cereal grain:cross-linking agent ratio of about 95:5 to about 99.5:0.5, more preferably about 98:2 to about 99:1, with formaldehyde, glutaraldehyde, and a mixture of adipic acid and acetic anhydride, being preferred; the cross-linking period being about 0.5 to 24 hours at ambient temperature, more preferably about 1 to 6 hours at an elevated temperature (i.e., about 50° C.); removing the organic solvent and the excess cross-linking agent; drying the solvent-treated, cross-linked cereal grain residue; and remoistening the residue to a moisture content of about 10 to 20%.

A cross-linked thermoplastic composition prior to molding may also be prepared by combining together, in admixture, a cereal grain, organic solvent and cross-linking agent, for a time effective to extract a major portion of the lipids from the cereal grain and to link the starch and protein of the cereal grain, in a cereal grain:solvent weight ratio of about 1:1 to 1:5, more preferably about 1:1.5 to 1:3, and a cereal grain:cross-linking agent ratio of about 99.5:0.5, more preferably about 98:2 to 99:1; removing the organic solvent extract from the mixture to provide a cross-linked, cereal grain residue; washing the residue to remove excess cross-linking agent; drying the residue; and remoistening the residue to a moisture content of about 10–20%.

A composition prior to molding, comprises about 30 to 100 wt-%, preferably about 50 to 95 wt-%, preferably about 60 to 90 wt-%, of the solvent-treated, cross-linked cereal grain. Other additives such as a plasticizer, coloring agent, lubricating agent, extender, and the like may also be included in the composition.

To facilitate molding of the composition into a shaped article, the dried residue may be remoistened with an effective amount of water to provide a moisture content of about 5 to 30%, more preferably about 10 to 20%. Optionally, the composition may be extruded with or without heating into a rod shape extrudate, and granulated into pellets or chips. To facilitate processing by extrusion, the residue may be combined with an effective amount of water to provide a water content of about 5% to 50%, and other additives such as a plasticizer, a lubricant, and the like.

The cereal grain-based compositions of the present invention may be formed into a desired article according to conventional processing techniques known in the art for molding thermoplastic materials. For example, the composition may be shaped by compression molding wherein direct pressure is applied using a hydraulic press on an amount of the composition contained in a cavity; by injection molding wherein an amount of the plastic composition in melted form is forced into a mold and maintained under pressure until cool; by blow molding wherein a tube of the thermoplastic composition is extruded into a mold and air pressure is applied to the inside of the tube to conform it to the mold and form a hollow article; and by other methods such as rotation molding, transfer molding, extrusion molding, vacuum forming, thermo-forming, pressure forming, and inflation molding.

The composition of the invention may be molded to provide articles of varying shapes, sizes and dimensions, that are useful in a variety of applications. The articles that are formed from the present compositions can be translucent in appearance and can have a high degree of mechanical strength, and water-resistance. For example, the composition may be molded into an article such as a sheet, film, capsule, tray, bottle, tubing or the like. The composition of the invention may be molded or extruded to provide foamed products such as packaging, loose fills, foamed dishes and cups, and the like. Residual water in the composition may be suitably used as a blowing agent. The articles may be used for packaging another article or substance such as foods, drugs and the like, that contain moderate amounts of water. As a further example, the compositions may be molded into dishware such as a cup or a plate, flatware such as a knife, fork or other eating utensil, or other like articles.

The compositions of the invention are useful for providing articles that are biodegradable but with improved water-resistance, particularly the articles formed from cross-linked compositions, so that the article will remain structurally intact for an extended period of time upon exposure to water. Although the articles made from the composition of the invention will degrade over time when exposed to moisture, such as from the atmosphere and the package contents, or from submersion in water or other direct contact with water, the articles of the invention, particularly those that include a cross-linking agent, have a higher resistance to such disintegration and will remain substantially intact for a more extended period of time than articles made from other starch-based thermoplastics. Preferably, an article made with a composition without a cross-linking agent will remain intact for about 1-3 days, and an article that includes a cross-linking agent will remain intact for about 5-7 days.

Apart from being biodegradable, the compositions may be comprised entirely of components that are edible by a mammal including humans, or other animal, so that articles molded from such compositions may be safely consumed by the animal. Such edible compositions would be useful for making, for example, a packaging article that may be consumed by the user along with the package contents, dishes and flatware that may be ingested following a meal, a food article for consumption by a human or other animal such as a snack food or a domestic pet or other animal food, or other articles where consumption of the article is desired.

The invention will be further described by reference to the following detailed examples. These examples are not meant to limit the scope of the invention that has been set forth in the foregoing description. It should be understood that many variations and modifications may be made while remaining within the spirit and scope of the invention. The disclosure of the cited references are incorporated by reference herein.

The solvent-treated and cross-linked, solvent-treated cereal grain compositions that are set forth in the following examples, were molded into a standard dogbone-shaped article as described in the American Society for Testing and Materials (ASTM D 638-86). Tensile properties of the molded articles were tested according to ASTM standard method D 638-86 using an Instron Universal Testing System (Model 4052, Canton, Mass.). Percent water absorption was measured according to ASTM D 570-81 procedure.

EXAMPLE 1

Solvent-Treated Corn Meal Thermoplastics Prepared at Room Temperature

A commercial grade, degerminated corn meal (Illinois Cereal Mills, Inc., Paris, Ill.) was suspended, in a sealed container, in an organic solvent (methanol or n-hexane) at a 2:3 corn meal:solvent weight ratio. The mixture stood at room temperature (25° C.), without mixing, for 18 hours. The organic solvent was filtered off from the cereal grain using an aspirator. The cereal grain residue was washed during filtering with an aliquot of organic solvent (methanol or n-hexane) in a 1:1 residue:solvent weight ratio. The residue was dried in a convection oven at 50° C. for 16 hours. The dried residue was sprayed with water with mixing until the moisture content of the residue was 10.7 to 11.3%.

The solvent-treated corn meal composition was molded into an ASTM standard dogbone article using a compression molding press (Wabash Metal Products, Inc. Wabash, Ind.) at 5000 psi, 140°-160° C. for 10 minutes. The untreated corn meal composition was likewise combined with water to a 10.7-11.3% water content and molded into an ASTM standard dogbone article.

The molded articles that were formed from the untreated corn meal compositions were opaque in appearance with a brittle structure. By contrast, the articles that were produced with the solvent-treated corn meal compositions were brown-colored and translucent, and had significantly improved tensile properties, as shown below in Table 1.

The molded articles were submersed in distilled water at room temperature (25° C.) for 24 hours. Water absorption of the molded articles was tested at 2 hours and at 24 hours according to ASTM standard method D570-81, the disclosure of which is incorporated by reference herein. The articles formed from both the solvent-treated and untreated corn meal compositions started to disintegrate within two hours of being immersed in water, becoming increasingly swollen and gradually cracked during the 24-hour period. Within 48 hours, the articles had substantially disintegrated.

TABLE 1

Tensile Properties and Percent Water Absorptions of the Compression-Molded Articles from Native and Solvent-Treated Degerminated Corn Meals.

| Cereal | Solvents | $TS^a$ (kg/mm$^2$) | $PE^a$ (%) | $YM^a$ (kg/mm$^2$) | % Water absorp.$^b$ 2 hrs | 24 hrs |
|---|---|---|---|---|---|---|
| Corn Meal | None | 0.2(0.0)$^c$ | 0.6(0.1) | 87(4) | Disint.$^d$ | Disint. |
|  | Methanol | 0.7(0.1) | 0.8(0.1) | 95(2) | Disint. | Disint. |

TABLE 1-continued

Tensile Properties and Percent Water Absorptions of the Compression-Molded Articles from Native and Solvent-Treated Degerminated Corn Meals.

| Cereal | Solvents | TS[a] (kg/mm$^2$) | PE[a] (%) | YM[a] (kg/mm$^2$) | % Water absorp.[b] 2 hrs | 24 hrs |
|---|---|---|---|---|---|---|
| | n-Hexane | 0.6(0.1) | 0.8(0.2) | 99(4) | Disint. | Disint. |

[a]Tensile strength at breakage (TS), percent elongation at breakage (PE) and Young's modulus (YM) were measured according to ASTM D 638-86 procedure.
[b]Percent water absorption was measured according to ASTM D 570-81 procedure.
[c]( ) = standard deviation
[d]Disintegrated.

EXAMPLE 2

Solvent-Treated Corn Flour Thermoplastics Prepared at Room Temperature

Compositions were formulated of degerminated corn flour (Illinois Cereal Mills, Inc. Paris, Ill.) which was made of particles that passed through a US 60 mesh screen, which were smaller in size than the corn meal that was used in Example 1 above. The corn flour compositions were prepared as described in Example 1, except that the corn flour was also treated with ethanol or chloroform. The compositions were compression-molded to form dogbone-shaped articles and tested according to the procedure described in Example 1. The formulations of the compositions that were prepared and test results of the formed articles are presented below in Table 2.

Similar to the solvent-treated corn meal compositions of Example 1, articles formed from the solvent-treated corn flour compositions were significantly improved in tensile properties as compared to the articles formed from the untreated corn flour compositions. Articles formed from the composition comprising corn flour treated with chloroform were strongest mechanically with 1.8 kg/mm$^2$ tensile strength and 1.4% percent elongation. All of the molded-articles started to disintegrate within 2 hours of being immersed in water at room temperature (25° C.).

EXAMPLE 3

Solvent-Treated Wheat Flour Thermoplastics Prepared at Room Temperature

Compositions comprising spring wheat flour (General Mills, Inc., Carlisle, Iowa, 14.2% protein) were prepared according to the procedure in Example 1, except that the flour was also treated with ethanol, n-hexane, or chloroform as the organic solvent. The formulations of the compositions are set forth below in Table 3. Articles were compression molded from the solvent-treated and untreated compositions, and tested according to the procedure described in Example 1.

Similar to the articles formed from the solvent-treated corn meal and corn flour compositions, the articles that were formed from the solvent-treated wheat flour compositions had significantly improved tensile properties over articles formed from the non-treated wheat flour compositions, as shown below in Table 3.

Compositions comprising ethanol-treated wheat flour produced the strongest articles with 1.9 kg/mm$^2$ tensile strength and 2.3% percent elongation. The articles formed from wheat flour were more water-resistant (approximately 42% water absorption after 24 hrs) than articles formed from corn flour.

TABLE 2

Tensile Properties and Percent Vater Absorption of the Compression-Molded Articles from Native and Solvent-Treated Degerminated Corn Flours.

| Cereal | Solvents | TS[a] (kg/mm$^2$) | PE[a] (%) | YM[a] (kg/mm$^2$) | % Water absorp.[b] 2 hrs | 24 hrs |
|---|---|---|---|---|---|---|
| Corn flour | None | 0.2(0.0)[c] | 0.6(0.1) | 103(19) | Disint.[d] | Disint. |
| | Ethanol | 0.9(0.2) | 0.9(0.1) | 153(74) | Disint. | Disint. |
| | n-Hexane | 1.7(0.4) | 1.3(0.3) | 211(10) | Disint. | Disint. |
| | Chloroform | 1.8(0.1) | 1.4(0.5) | 201(7) | Disint. | Disint. |

[a]Tensile strength at breakage (TS), percent elongation at breakage (PE) and Young's modulus (YM) were measured according to ASTM D 638-86 procedure.
[b]Percent water absorption was measured according to ASTM D 570-81 procedure.
[c]( ) = standard deviation
[d]Disintegrated.

TABLE 3

Tensile Properties and Percent Water Absorptions of the Compression-Molded Articles from Native and Solvent-Treated Wheat Flours.

| Cereal | Solvents | TS[a] (kg/mm$^2$) | PE[a] (%) | YM[a] (kg/mm$^2$) | % Water absorp.[b] 2 hrs | 24 hrs |
|---|---|---|---|---|---|---|
| Wheat flour | None | 0.7(0.2)[c] | 0.9(0.1) | 90(9) | 12.1(1.3) | Disint.[d] |
| | Ethanol | 1.9(0.3) | 2.3(0.2) | 181(9) | 12.8(0.2) | 42.5(0.9) |
| | n-Hexane | 1.5(0.3) | 1.6(0.1) | 195(11) | 12.5(0.4) | 41.5(1.7) |
| | Chloroform | 1.6(0.0) | 1.9(0.3) | 186(13) | 12.7(0.3) | 41.9(0.6) |

[a]Tensile strength at breakage (TS), percent elongation at breakage (PE) and Young's modulus (YM) were measured according to ASTM D 638-86 procedure.
[b]Percent water absorption was measured according to ASTM D 570-81 procedure.
[c]( ) = standard deviation
[d]Disintegrated.

EXAMPLE 4

Solvent-Treated Semolina Thermoplastics Prepared at Room Temperature

Compositions comprising semolina (durum wheat flour, General Mills, Inc., Minneapolis, Minn.) were prepared according to the procedure set forth in Example 1, except that the cereal grain was treated with an organic solvent comprising absolute methanol or an aqueous mixture of a 1:1 volume-mixture of methanol and water. Untreated and solvent-treated compositions were molded into ASTM dogbone-shaped articles and tested as provided in Example 1.

The compositions comprising untreated semolina provided stronger articles than the compositions comprising untreated corn flour or untreated wheat flour. Similar to the solvent-treated corn and wheat flour compositions, the solvent-treated semolina compositions provided compression-molded articles that had improved tensile properties over articles formed from untreated semolina compositions, as shown in Table 4 below.

The compositions comprising semolina treated with a 1:1 mixture of methanol and water, produced the strongest articles with 1.9 kg/mm$^2$ of tensile strength and 1.8% elongation at break. Water absorption of the articles formed from the semolina/methanol/water compositions was 48.4% after 24 hours water immersion at room temperature.

TABLE 4

Tensile Properties and Percent Water Absorptions of the Compression-Molded Articles from Native and Solvent-Treated Semolinas.

| Cereal | Solvents | TS[a] (kg/mm$^2$) | PE[a] (%) | YM[a] (kg/mm$^2$) | % Water absorp.[b] 2 hrs | 24 hrs |
|---|---|---|---|---|---|---|
| Semolina | None | 1.0(0.1)[c] | 1.1(0.2) | 145(4) | 15.3(0.3) | disint.[d] |
| | Aqueous methanol | 1.9(0.2) | 1.8(0.4) | 195(16) | 13.4(0.6) | 48.4(0.7) |
| | n-Hexane | 1.7(0.0) | 1.6(0.0) | 198(6) | 18.2(0.1) | 57.0(0.5) |
| | Chloroform | 1.2(0.3) | 2.0(0.6) | 169(8) | 14.3(1.1) | 46.7(2.4) |

[a]Tensile strength at breakage (TS), percent elongation at breakage (PE) and Young's modulus (YM) were measured according to ASTM D 638-86 procedure.
[b]Percent water absorption was measured according to ASTM D 570-81 procedure.
[c]( ) = standard deviation
[d]Disintegrated.

TABLE 5

Tensile Properties and Percent Water Absorptions of the Compression-Molded Articles from Ethanol-Treated Cereal Flours Prepared with Heat.

| Cereal | TS[a] (kg/mm$^2$) | PE[a] (%) | YM[a] (kg/mm$^2$) | % Water absorp.[b] 2 hrs | 24 hrs |
|---|---|---|---|---|---|
| Corn meal | 1.1(0.2)[c] | 1.3(0.3) | 185(8) | Disint.[d] | Disint. |
| Corn flour | 1.0(0.1) | 1.0(0.1) | 195(12) | Disint. | Disint. |
| Wheat flour | 1.9(0.4) | 2.4(0.3) | 134(54) | 14.1(0.3) | 46.5(1.2) |
| Semolina | 1.6(0.1) | 2.2(0.1) | 122(1) | 15.8(0.4) | 52.2(0.5) |

[a]Tensile strength at breakage (TS), percent elongation at breakage (PE) and Young's modulus (YM) were measured according to ASTM D 638-86 procedure.
[b]Percent water absorption was measured according to ASTM D 570-81 procedure.
[c]( ) = standard deviation
[d]Disintegrated.

EXAMPLE 6

Ethanol-Treated and Formaldehyde-Cross-Linked Cereal Flours Prepared at Room Temperature Cereal flours (corn meal, corn flour, wheat flour, semolina) were suspended in an aqueous ethanol (95%) at a 1:3 flour:solvent weight ratio, and the mixture was heated at boiling temperature with reflux and mechanical stirring for 2 hours. The mixture was filtered using an aspirator to remove the solvent. The residue was mixed with a dilute formaldehyde solution (1% formaldehyde in 50% aqueous ethanol solution) at a 1:1 (solid weight) residue: formaldehyde solution weight ratio. The mixture was allowed to react without stirring for 24 hours at room temperature, and then excess formaldehyde was removed by washing the flour residue three times with 50% aqueous ethanol at a weight ratio of 1:1 solvent:flour per wash. The flour residue was then dried, remoistened and molded according to the procedure in Example 1.

The formaldehyde treatment with the solvent-treated flour significantly improved the mechanical properties and water-resistance of the articles formed from the compositions as compared to the solvent-treated, non-cross-linked composition, as shown in Table 6 below.

The composition containing wheat flour treated with ethanol and 1% formaldehyde produced the strongest, and most water-resistant articles with 2.6 kg/mm$^2$ of tensile strength, 2.8% elongation at break, and 39.6% water absorption after 24 hours water immersion at room temperature.

The higher tensile strength and lower % water absorption of the articles formed from the cross-linked composition demonstrates that cross-linking the starch and protein macromolecules of the cereal grain with a formaldehyde cross-linker provides a rigid network structure that increases the water resistance of the formed articles.

EXAMPLE 5

Ethanol-Treated Cereal Flours Prepared with Heat

Cereal flours (corn meal, corn flour, wheat flour, semolina) were separately suspended in an aqueous ethanol (95%) at 1:3 wt-ratio, and the mixtures were boiled for 2 hours with reflux and mechanical stirring. The mixtures were filtered using an aspirator to remove the solvent, and the residues were washed with ethanol (1:1 flour:ethanol ratio). The flour residues were dried, remoistened, and molded according to the procedure in Example 1.

Tensile properties and water-absorption of the cereal flours treated with ethanol at boiling temperature for a short 2 hour period were similar to the flours treated at room temperature for an extended 18 hour period. These results indicate that the extraction time can be significantly reduced with the application of heat without a significant change in the physical properties of the molded articles.

TABLE 6

Tensile Properties and Percent Water Absorptions of the Compression-Molded Articles from Ethanol-Treated and Cross-Linked Flours (1% Formaldehyde)

| Cereal | TS[a] (kg/mm$^2$) | PE[a] (%) | YM[a] (kg/mm$^2$) | % Water absorp.[b] 2 hrs | 24 hrs |
|---|---|---|---|---|---|
| Corn meal | 1.1(0.1)[c] | 1.0(0.1) | 199(10) | Disint.[d] | Disint. |
| Corn flour | 1.5(0.3) | 1.4(0.2) | 175(10) | Disint. | Disint. |
| Wheat flour | 2.6(0.3) | 2.8(0.1) | 180(2) | 13.5(0.2) | 39.6(0.5) |
| Semolina | 1.7(0.1) | 2.2(0.1) | 122(1) | 14.5(0.4) | 43.6(2.5) |

[a]Tensile strength at breakage (TS), percent elongation at breakage (PE) and Young's modulus (YM) were measured according to ASTM D 638-86 procedure.
[b]Percent water absorption was measured according to ASTM D 570-81 procedure.
[c]( ) = standard deviation
[d]Disintegrated.

EXAMPLE 7

Ethanol-Treated and Formaldehyde-Cross-Linked Wheat Flour Prepared at 50° C.

Wheat flour was treated with 95% ethanol and 1% formaldehyde according to the procedure in Example 6, except that the cross-linking reaction with the formaldehyde solution took place at 50° C. for 1 and 3 hours in a sealed container without stirring.

As shown in Table 7 below, cross-linking of the composition at a higher temperature (50° C.) for a short time period (1-3 hrs) produced molded articles with significantly improved tensile properties. Water absorptions of the molded articles were slightly higher than articles made of non-cross-linked wheat flour (see, Table 5).

TABLE 7

Tensile Properties and Percent Water Absorptions of the Compression-Molded Articles from Cross-Linked Wheat Flours with 1% Formaldehyde Prepared at 50 C.

| Reaction Time | TS[a] (kg/mm$^2$) | PE[a] (%) | YM[a] (kg/mm$^2$) | % Water absorp.[b] 2 hrs | 24 hrs |
|---|---|---|---|---|---|
| 1 hour | 2.3(0.2)[c] | 2.8(0.3) | 131(4) | 19.1(0.7) | 51.3(1.2) |
| 3 hours | 2.5(0.1) | 2.9(0.0) | 112(1) | 18.9(1.0) | 48.9(0.6) |

[a]Tensile strength at breakage (TS), percent elongation at breakage (PE) and Young's modulus (YM) were measured according to ASTM D 638-86 procedure.
[b]Percent water absorption was measured according to ASTM D 570-81 procedure.
[c]( ) = standard deviation

EXAMPLE 8

Ethanol-Treated and Adipic Acetic Anhydride-Cross-Linked Wheat Flour Prepared at 50° C.

Wheat flour was treated with 95% ethanol according to the procedure in Example 5, and cross-linked with 6 wt-% of an adipic acid-acetic anhydride mixture. The adipic acid-acetic anhydride mixture was prepared by dissolving 6 grams of adipic acid in 94 grams acetic anhydride.

The adipic acid-acetic anhydride solution was diluted to 6% based on the dry weight of wheat flour, in 50% aqueous ethanol in a same total weight of the dilute as the flour, and the dilute was adjusted to pH 10.5 with a 10% sodium hydroxide solution. After the pH was adjusted, the ethanol-treated wheat flour was immediately mixed with the dilute, and the mixture was allowed to react at 50° C. for 3 hours without stirring in a sealed container. The pH of the mixture dropped to approximately pH 6.5 following the reaction. Excess adipic acid and acetic anhydride were removed by washing with 50% ethanol at a weight ratio of 1:1 per wash. The flour residue was dried, remoistened, and molded according to the procedure in Example 1.

As shown in Table 8 below, the cross-linking of the wheat flour with an adipic acid-acetic anhydride mixture significantly improved the tensile properties of the articles with 2.7 kg/mm$^2$ of tensile strength and 2.9% elongation at break. Percent water absorption of the cross-linked articles was higher than articles made from non-cross-linked wheat flour (Table 5). The decreased water-resistance may be caused by the acetylation that may occur simultaneously with cross-linking.

TABLE 8

Tensile Properties and Percent Water Absorptions of the Compression-Molded Articles from Ethanol-Treated and Adipic Acid-Acetic Anhydride-Cross-Linked Wheat Flour (6% AD, 50 C., 3 hrs)

| | TS[a] (kg/mm$^2$) | PE[a] (%) | YM[a] (kg/mm$^2$) | % Water absorp.[b] 2 hrs | 24 hrs |
|---|---|---|---|---|---|
| Wheat flour | 2.7(0.6)[c] | 2.9(0.3) | 326(68) | 24.2(1.6) | 62.8(0.7) |

[a]Tensile strength at breakage (TS), percent elongation at breakage (PE) and Young's modulus (YM) were measured according to ASTM D 638-86 procedure.
[b]Percent water absorption was measured according to ASTM D 570-81 procedure.
[c]( ) = standard deviation

What is claimed is:

1. A thermoplastic composition, comprising: about 30-100 wt-% cereal grain comprising about 60-95% starch and about 5-40% protein, the cereal grain having been treated with an effective amount of an organic solvent to extract a substantial portion of lipids from the cereal grain; the organic solvent selected from the group consisting of alcohols, alkanes, ethers, halides, aromatics, esters and ketones.

2. The composition according to claim 1, wherein the cereal grain comprises flour, meal or grits.

3. The composition according to claim 1, wherein the cereal grain comprises a cereal grain selected from the group consisting of hard wheat, soft wheat, corn, rice, high amylose corn, oat, rye, barley, sorghum, millet, triticale, amaranth, waxy corn waxy rice, or a combination thereof.

4. The composition according to claim 1, wherein the cereal grain is degerminated.

5. The composition according to claim 1, wherein the cereal grain has been treated with a bleaching agent selection from the group consisting of chlorine gas, hydrogen peroxide, and benzoyl peroxide.

6. The composition according to claim 1, wherein the cereal has been treated with an effective amount of a cross-linking agent to bind the starch and protein together so as to form a water-resistant, biodegradable, moldable thermoplastic composition; wherein the cross-linking agent is selected form the group consisting of aldehydes, epoxides, polyepoxides, acid anhydrides, phosphorus oxychloride and metaphosphates.

7. The composition according to claim 6, wherein the cereal grain is treated with the cross-linking agent in a ratio of about 90:10 to about 99.99:0.01.

8. The composition according to claim 6, wherein the cross-linking agent is an aldehyde selected from the group consisting of glutaraldehyde, formaldehyde, glyoxal, acetaldehyde, glyceraldehyde, furfuraldehyde, malonic dialdehyde, succinic dialdehyde, adipic dialdehyde, starch dialdehyde, acrolein, or a combination thereof.

9. The composition according to claim 6, wherein the cross-linking agent is an epoxide selected from the group consisting of epichlorohydrin, 3-chloro-1,2-epoxypropane, 3-bromo-1,3-epoxypropane, 3-chloro-1,2- epoxybutane, 3-4-dichloro-1,2-epoxybutane, 4-chloro-1,2-epoxypentane, chloroepoxyoctanes, vinyl cyclohexane dioxide, butadiene dioxide, or a combination thereof.

10. The composition according to claim 6, wherein the cross-linking agent is an acid anhydride comprising adipic acid and acetic anhydride, citric acid and acetic anhydride, adipic acid and propionic anhydride, citric acid and propionic anhydride, or a combination thereof.

11. The composition according to claim 1, wherein the cereal grain is treated with the solvent in a ratio of about 1:1 to about 1:5.

12. The composition according to claim 1, wherein the organic solvent comprises ethanol, methanol, propanol, isopropanol, butanol, n-pentane, n-hexane, petroleum, ether, diethylether, methylene chloride, chloroform, benzene, ethyl acetate, acetone, or a mixture thereof.

13. The composition according to claim 1, further comprising about 5-30 wt-% water.

14. The composition according to claim 1, further comprising about 0.2-20 wt-% of a plasticizer, about 3-50 wt-% of an extender, about 0.1-2 wt-% of a lubricant agent, or a combination thereof; wherein the plasticizer is selected from the group consisting of dihydric alcohols, polyhydric alcohols, derivatives thereof, and any combination thereof; the extender is selected from the group consisting of cellulosic polysaccharides, synthetic polymers, natural gums, modified gums, and any combination thereof; and the lubricating agent is selected from the group consisting of monoglycerides, diglycerides, fatty acids, phospholipids, fatty acid esters, phosphoric acid derivatives of esters of polyhydroxy compounds, vegetable oils, animal lipids, petroleum silicone, waxes, mineral oils, and any combination thereof.

15. The composition according to claim 14, wherein the plasticizer is a polyhydric alcohol selected from the group consisting of glycerol, glycerol monoacetate, diacetate or triacetate, sorbitol, sorbitan, mannitol, maltitol, ethylene glycol, propylene glycol, polyvinyl alcohol, sodium cellulose glycolate, cellulose methyl ether, sodium alginate, sodium diethysuccinate, triethyl citrate, polyethylene glycols, polypropylene glycols, polyethylene propylene glycols, and mixtures thereof.

16. The composition according to claim 14, wherein the extender is selected from the group consisting of methylcellulose, carboxymethylcellulose, hydroxymethylcellulose, microcrystalline cellulose, natural cellulose, cellulose acetate, cellulose nitrate, poly(acrylic acid), poly(methacrylic acid), poly(vinyl acetate, poly(vinyl alcohol), poly(vinyl acetate phthalate), ethylene/vinyl acetate copolymer, ethylene/vinyl alcohol copolymer, polyhydroxybutylate, xanthum gum, guar gum, gum arabic, alginate, carrageenan, pectin, agar, and konjac flour.

17. The composition according to claim 1, further comprising about 0.001-10 wt-% of a coloring agent selected from the group consisting of azo dyes, natural coloring agents, metallic oxides, and any combination thereof.

18. A method of making a biodegradable thermoplastic composition, comprising:
 (a) combining a cereal grain with an effective amount of an organic solvent to form a mixture and extract a substantial portion of lipids from the cereal grain; the organic solvent selected from the group consisting of alcohols, alkanes, ethers, halides, aromatics, esters and ketones;
 (b) removing the solvent from the mixture to provide a cereal grain residue; and
 (c) drying the residue.

19. The method according to claim 18, wherein the cereal grain:solvent weight ratio is about 1:1 to 1:5.

20. The method according to claim 18, wherein combining step (a) comprises extracting the lipids from the cereal grain over a period of about 0.5-48 hours.

21. The method according to claim 18, wherein combining step (a) further comprises heating the admixture to the boiling temperature of the solvent.

22. The method according to claim 18, wherein removal step (b) comprises filtering or centrifuging the admixture to remove the organic solvent.

23. The method according to claim 18, further comprising after the removal step (b), the steps of:
 (i) washing the residue with an effective amount of an organic solvent to remove residual lipids from the residue; and
 (ii) removing the solvent from the washed residue.

24. The method according to claim 18, further comprising, after removal step (b), the steps of:
 (i) combining the residue with a minor effective amount of a cross-linking agent to link starch and protein molecules of the cereal grain to form a cross-linked residue; wherein the crosslinking agent is selected from the group consisting of aldehyde, epoxide, polyepoxides, acid anhydrides, phosphorus oxychloride, and metaphosphates;
 (ii) washing the cross-linked residue with an effective amount of an organic solvent to remove residual cross-linking agent from the residue; and
 (iii) removing the solvent from the washed, cross-linked residue.

25. The method according to claim 24, wherein the cereal grain:cross-linking agent ratio is about 90:10 to about 99.99:0.01.

26. The method according to claim 24, wherein step (i) further comprises reacting the cross-linking agent with the cereal grain for a time period of about 0.5 to 24 hours.

27. The method according to claim 26, wherein the cross-linking agent in step (i) is combined with an organic solvent which is the same as or different from the organic solvent of step (ii), and step (i) further comprises heating the cross-linking agent and the cereal grain to reflux, to the boiling temperature of the solvent.

28. The method according to claim 18, wherein step (a) further comprises combining the cereal grain and the organic solvent mixture with a minor but effective amount of a cross-linking agent to link starch and protein molecules of the cereal grain to form a cross-linked, biodegradable, cereal grain-based thermoplastic composition.

29. The method according to claim 28, wherein the cereal grain:cross-linking agent ratio is about 90:10 to about 99.99:0.01.

30. The method according to claim 28, wherein step (a) further comprises reacting the cereal grain with the organic solvent and the cross-linking agent for a time period of about 0.5 to 24 hours.

31. The method according to claim 28, wherein the step (a) further comprises heating the mixture to reflux, to the boiling temperature of the solvent.

32. The method according to claim 18, further comprising a step (d) of remoistening the residue with an effective amount of water, wherein the composition comprises about 5–50% by weight water.

33. The method according to claim 32, wherein the composition comprises about 5–30% by weight water.

34. The method according to claim 32, further comprising a step (e) of molding the composition to provide a shaped article that is capable of remaining structurally intact without significant deterioration when exposed to water at a temperature of about 20°–30° C. for a period of about 2–7 days.

35. The method according to claim 34, wherein the composition is molded into the article by injection molding, blow molding, compression molding, transfer molding, extrusion molding, vacuum molding, rotation molding, thermo-forming, or expanded foam molding.

36. A method according to claim 32, wherein step (d) further comprises combining the remoistened residue with about 0.2–20 wt-% of a plasticizer, about 0.1–2 wt-% of a lubricating agent, about 3–50 wt-% of an extruder, or any combination thereof; wherein the plasticizer is selected form the group consisting of dihydric alcohols, polyhydric alcohols, derivatives thereof, and any combination thereof; the extender is selected from the group consisting of cellulosic polysaccharides, synthetic polymers, natural gums, modified gums, and any combination thereof; and the lubricating agent is selected from the group consisting of monoglycerides, diglycerides, fatty acids, phospholipids, fatty acid esters, phosphoric acid derivatives of esters of polyhydroxy compounds, vegetable oils, animal lipids, petroleum silicone, waxes, mineral oils, and any combination thereof.

37. A method according to claim 32, further comprising a step (e) of extruding the composition with or without heat, and granulating the extruded composition into pellets or chips.

* * * * *

UNITED STATES PATENT AND TRADEMARK OFFICE
CERTIFICATE OF CORRECTION

PATENT NO. : 5,320,669
DATED : June 14, 1994
INVENTOR(S) : Lim et al.

Page 1 of 2

It is certified that error appears in the above-identified patent and that said Letters Patent is hereby corrected as shown below:

Column 1, after the title, insert the following statement.
This invention was made with government support from the U.S. Department of Agriculture under Hatch funds, project number 2863. The government may have certain rights in the invention.--.

In column 3, line 9, for "9rain" read --grain--.

In claim 3, column 16, line 39, after "waxy corn" insert --,--.

In claim 5, column 16, line 45, for "selection" read --selected--.

In claim 6, column 16, line 48, after "cereal" insert --grain--.

In claim 6, column 16, line 52, for "form" read --from--.

In claim 12, column 17, line 16, after "petroleum" delete ",".

In claim 14, column 17, lines 23-24, for "lubricant" read --lubricating--.

In claim 16, column 17, line 55, for "xanthum" read --xanthan--.

UNITED STATES PATENT AND TRADEMARK OFFICE
CERTIFICATE OF CORRECTION

PATENT NO. : 5,320,669

DATED : June 4, 1994

INVENTOR(S) : Lim et al.

It is certified that error appears in the above-identified patent and that said Letters Patent is hereby corrected as shown below:

In claim 24, column 18, lines 29-30, for "aldehyde" read --aldehydes--.

In claim 24, column 18, line 30, for "epoxide" read --epoxides--.

In claim 36, column 20, line 1, for "extruder" read --extender--.

Signed and Sealed this

Twenty-fifth Day of October, 1994

Attest:

BRUCE LEHMAN

Attesting Officer

Commissioner of Patents and Trademarks